United States Patent [19]

Owatari et al.

[11] 4,352,691
[45] Oct. 5, 1982

[54] LIQUID INK FOR PRINTERS

[75] Inventors: Akio Owatari; Yuki Yamada, both of Shiojiri, Japan

[73] Assignee: Shinshu Seiki Kabushiki Kaisha, Nagano, Japan

[21] Appl. No.: 197,731

[22] Filed: Oct. 16, 1980

[30] Foreign Application Priority Data

Oct. 17, 1979 [JP] Japan .................................. 54-133824

[51] Int. Cl.³ .............................................. C09D 11/02
[52] U.S. Cl. ......................................... 106/20; 106/22
[58] Field of Search ................................... 106/20, 22

[56] References Cited

U.S. PATENT DOCUMENTS

| 3,846,141 | 11/1974 | Ostergren et al. | 106/22 |
| 3,903,034 | 9/1975 | Zabiak et al. | 260/29.6 |
| 4,176,361 | 11/1979 | Kawada et al. | 106/22 |
| 4,210,566 | 7/1980 | Murry | 106/22 |

FOREIGN PATENT DOCUMENTS 2388870 4/1978 France.

Primary Examiner—Harold D. Anderson
Assistant Examiner—Amelia B. Yarbrough
Attorney, Agent, or Firm—Blum, Kaplan, Friedman, Silberman & Beran

[57] ABSTRACT

A liquid ink for printers including a component for dissolving at least one of a fibrous material, sizing material and surface treatment material included in the recording medium is provided. An aqueous liquid ink in accordance with the invention includes a water-soluble dye, a strong alkali material, at least one wetting agent and water. The pH of the ink is between about 10 and 14. Shelf life of the liquid ink is improved by including a preservative and the speed of ink penetration into the print paper can be increased by including a surface active agent.

11 Claims, 2 Drawing Figures

LIQUID INK FOR PRINTERS

BACKGROUND OF THE INVENTION

This invention relates generally to a liquid ink for printers, and more particularly to a liquid ink for printers including a strong alkali material for dissolving at least one of a fibrous material, a sizing material and a surface treatment material included in the recording medium. These inks are particularly wall suited for ink jet-type printers.

In an ink jet-type recording device, printing is accomplished by a print head which produces a minute liquid drop of ink. The ink drop is generally between about 50 and 150 μm in diameter and the print head includes means for ejecting the liquid ink drop to a predetermined position on a recording medium. Severl types of ink jet-type recording devices are available. These include an electrostatic deflection-type jet printer wherein the print head presses and ejects ink through a nozzle orifice having a diameter of about 30 to 150 μm. A charge is applied to the ejected liquid drop which is displaced and positioned on the recording medium selectively by an electric field so that the drop impacts at a predetermined position. In an impulse jet-type printer, the liquid drop of ink is ejected from varying positions of a print nozzle having a plurality of nozzle orifices so the drop impacts directly to the recording medium.

Various problems occur when printing with an electrostatic deflection-type printer or an impulse jet-type printer as follows:

1. The ink dries at the nozzle orifice in view of the minute diameters of 30 to 150 μm causing the nozzle orifice to clog when the viscosity of the ink is high or when the dye separates out from the liquid.
2. The ink takes a long time to dry from the time it first strikes the recording medium.
3. A bubble of air may tend to form in the liquid or along the route to the orifice so that high enough pressure cannot be generated in the pressure chamber of the recording head and a minute drop of ink cannot be expelled from the nozzle orifice.
4. A drop of ink striking the recording paper is not sufficiently round or does not provide sufficient contrast.

In view of these typical problems with ink utilized in an ink jet-type recording device, an improved ink for an ink jet-type recording device should perform as follows:

(a) The ink should not clog the nozzle orifice of the recording head;

(b) the ink should dry as soon as it strikes the recording paper;

(c) the ink should not include any component which generates air;

(d) the quality of the ink should be stable for long periods of time under storage;

(e) the ink should not include any component which corrodes material in contact with the ink; and (f) the ink should be of sufficiently high density so that the dot produced is round and provides sufficient contrast when the drop impacts the recording medium.

Based on these criteria, it can be seen that there are contradictory physical characteristics sought for a suitable ink for an ink jet-type printer. For example, the ink must be sufficiently slow drying in order not to clog the nozzle orifice as set forth in (a), and must dry shortly after impact upon a print medium or print paper as required in (b). Thus, it has generally been considered difficult to provide an ink for an ink jet-type printer which satisfies all of the criteria set forth in paragraphs (a) to (f), above.

Generally, most of the improvements for meeting the requirements set forth in paragraphs (a) to (f) have been provided by means other than changes in the ink composition. For example, a dryer may be included in a printing device for promptly drying the ink which is applied to the print paper in order to shorten the drying period and satisfy requirements (a) and (b). This is disadvantageous because it increases the size of the printing device. Additionally, it is uneconomical as the dryer consumes additional energy and it limits the type of print paper which can be used in the printing device.

Most of the inks utilized in ink jet-type recording are water-based inks. These water-type based inks generally include three important components, such as a dye, a wetting agent and a water vehicle, but must include two essential components. The dye is an essential component of the ink for providing color so that the dot striking the print paper will transcribe a desired character or figure which is rendered visually distinguishable. Water is the other essential component as it is the medium for carrying the transcribing dye to the recording paper. Thus, the water and dye are the essential components and sufficient for providing an ink which could be used in an ink jet-type recording device.

The nozzle orifice in an ink jet-type device is exposed to air so that the water evaporates causing the dye to separate out in the nozzle thereby clogging the nozzle. In order to prevent this clogging, a wetting agent is added to the ink composition. It is generally known that addition of wetting agent lowers the vapor pressure of the ink as proposed in U.S. Pat. No. 3,889,269. To some extent this prevents the dye from separating out at the nozzle orifice. This reduction in drying solves the clogging problem of (a), but creates a problem under (b) in that the ink does not dry promptly upon impacting the recording paper. In order to overcome this problem and increase drying time, a surface active agent has been added to the three component ink system. The surface active agent decreases the surface tension of the ink so that the ink may penetrate through the recording paper. However, when an ink composition includes a surface active agent, the ink generally penetrates in the random direction of the fibers of the recording paper. When this occurs, the criteria set forth in paragraph (f), above, for providing a high density round dot of sufficient contrast is not attained. That is, the dot is not sufficiently round due to diffusion of the droplet and the quality of the printing suffers.

Accordingly, it is highly desirable to provide an ink which satisfies all of the requirements (a) to (f) set forth above and will be suitable for an ink jet-type recording device. This ink must not clog nozzle oriices, but must also penetrate the recording paper while maintaining the required roundness after the drop strikes the recording paper.

SUMMARY OF THE INVENTION

Generally speaking, in accordance with the invention, an improved liquid ink for printers including a chemical component capable of dissolving at least one of a fibrous material, sizing material and a surface treatment material included in the recording medium is provided. Preferably, component for dissolving is a strong basic material which when added to the ink composition maintains the pH between about 10 and 14 at a temperature of 20° C. The basic material insures that the recording paper is corroded to some extent and permits the ink to penetrate through the paper rapidly. Liquid ink compositions in accordance with the invention include a water-soluble dye, a strong basic material, at least one wetting agent and the water vehicle.

In the preferred liquid ink compositions in accordance with the invenion, the ink includes up to about 10 weight percent of the water-soluble dye, between about 0.001 to 15 weight percent of a strong basic material, from about 5 to 45 weight percent of at least one wetting agent and the balance water, all weight percents based on the total weight of the composition. The preferred wetting agents are selected from the group consisting of aliphatic polyhydric alcohols and alkyl ether and acetate derivatives of the alcohol. Additionally, the ink may include a fluorocarbon surface active agent from about 0.001 to 0.1 weight percent. The ink compositions in accordance with the preferred embodiments have a pH between about 12 and 13.5 and a surface tension between about 21 to 48 dyne/cm both at 20° C.

Accordingly, it is an object of the invention to provide an improved liquid ink.

A further object of the invention is to provide an improved liquid ink suitable for use in a jet-type printer.

Another object of the invention is to provide an improved aqueous ink for a jet-type printer including a strong basic material.

Yet another object of the invention is to provide an improved aqueous ink composition including a water-soluble dye, a strong basic material and at least one wetting agent.

Still another object of the invention is to provide an improved liquid ink for a jet-type printer which does not clog nozzle orifices of the recording head and provides suitable roundness and contrast in print quality.

Another object of the invention is to provide an improved aqueous ink for a jet-type printer which dries rapidly upon impact with the recording medium.

Still other objects and advantages of the invention will in part be obvious and will in part be apparent from the specification.

The invention accordingly comprises the several steps and the relation of one or more of such steps with respect to each of the others, and the composition possessing the features, properties and the relation of constituents, which are exemplified in the following detail disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Normal print recording paper is formed from pulp, a natural macromolecule. The pulp mixes well with water and generally absorbs a significant amount of water. There are many problems present in handling the pulp raw material. Therefore, a sizing material is generally added to the paper composition which decreases the speed of penetration of a printing ink. Additionally, the surface of the recording paper is made smooth and often a surface treatment material is coated on the surface of the surface of the paper which tends to decrease the speed of penetration of the ink. In accordance with the invention, it has been found that a printed character may be dried quickly by an ink which dissolves the sizing material and the surface treatment material and permits the ink to penetrate the paper as quickly as pssible. A printed character formed by an ink which has a pH in the range of about 10 to 14 is particularly well suited for use with printers and particularly an ink jet-type printer. Preferably, the pH of the ink is between about 12.0 and 13.5. The roundness of the printed dot obtained is also satisfactory.

Figure 1:
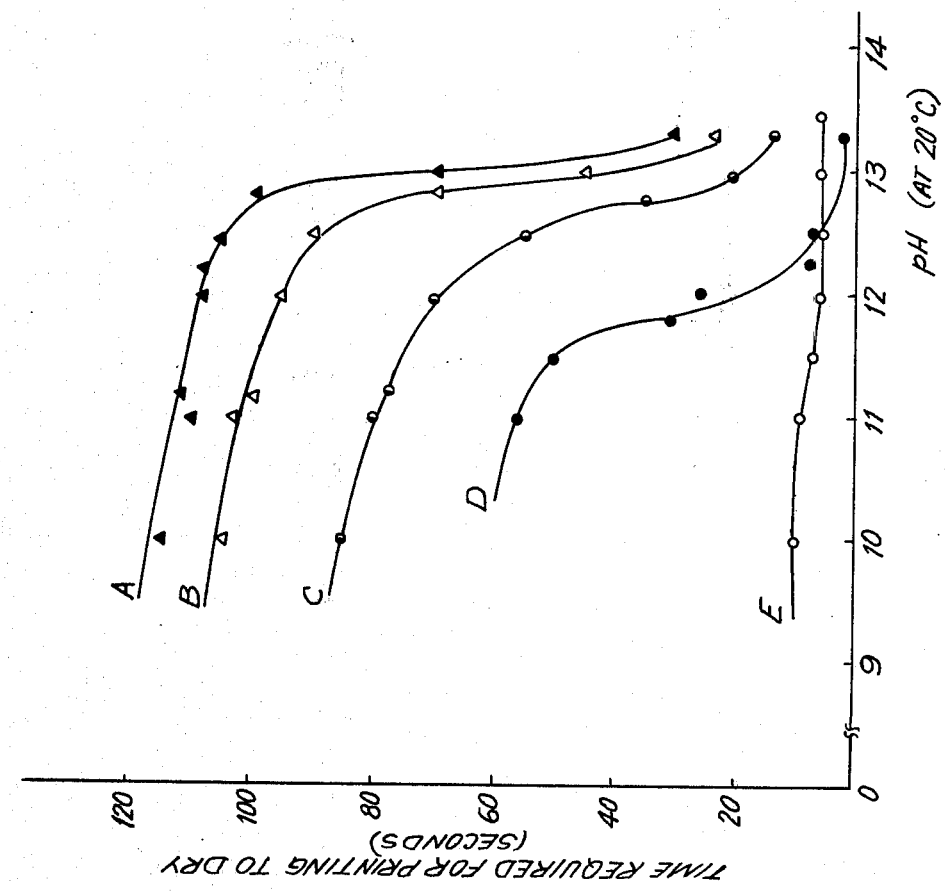
FIG. 1 is a graph illustrating the relationship between the pH of a liquid ink for a jet-type printer prepared in accordance with the invention and the time required for the ink to dry at 20° C. after being printed by a multi-head printer having a nozzle orifice of 40 μm on various recording papers.

The graph of FIG. 1 illustrates the relationship between the pH of an ink prepared in accordance with the invention and the time required for the ink to dry on various recording papers A, B, C, D and E at a temperature of 20° C. These times were obtained by actual experiments and measured as follows. The characters were printed by a multi-nozzle orifice wherein the nozzle diameter was 40 μm. The diameter of a liquid drop of ejected ink was 80 m. The recorded time required for the printed character to dry was the time the drop impacted the recording paper to when the print on the paper was not soiled or the paper was not soiled when touched by hand.

Figure 2:
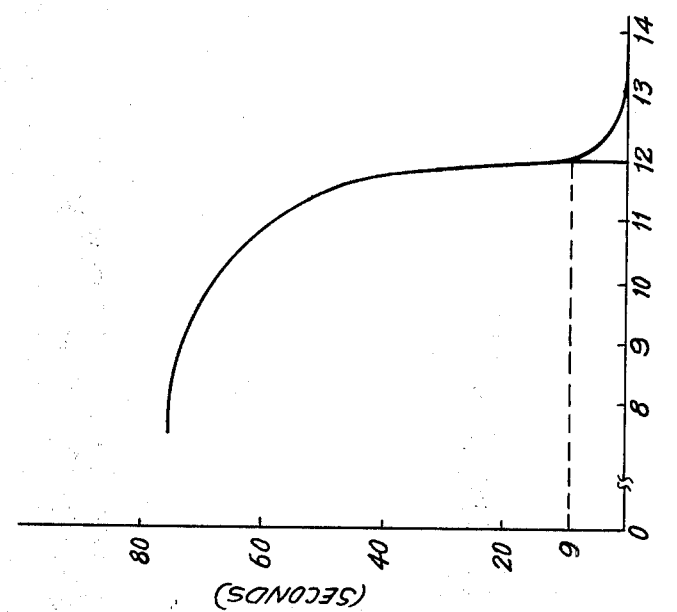
FIG. 2 is a graph illustrating the relationship between the pH of an ink at 20° C. and the time required for the ink to dry as illustrated in FIG. 1.

As shown in FIGS. 1 and 2, the time for the printed character to dry decreases when the pH of the ink lies between about 10 and 14. The drying time decreases significantly within the range between 12 and 13.5. This decrease in drying time has a small dependency on the type of paper used. Additionally, the quality of the printed character is satisfactory. The form of the printed character does not spread randomly in the diverse direction of the fibers of the print paper as occurs when a character is printed by an ink having a lowered surface tension due to presence of a surfce active agent. The ink prepared in accordance with the invention provides a superior rounded dot.

Generally, the time for a printed character to dry is dependent not only upon the paper, but also upon the character pattern as well as the quantity of ink. When an ink prepared in accordance with the invention is utilized, the time for the ink to dry is dependent almost solely on the pH of the ink. Accordingly, the drying characteristics of an ink prepared in accordance with the invention is superior to conventional inks wherein the same character pattern is printed in the same type of printer on similar print papers.

As noted above, it has been found that the time for a printed character to dry decreases significantly when the ink has a pH in the range of 12 to 13.5. Thus, this is the preferred pH range in accordance with the invention. Additionally, it is noted that for the B type paper, the time for the character to dry when the ink has pH of 12.5 is almost the same as the time for a print character printed on a C type paper to dry when the ink has a pH of 10. This demonstrates that the time for the printed character to dry varies in accordance with the type of print paper. Thus, the benefits obtained in accordance with the invention are present in a range between about 10 at the minimum and about 14 as a maximum. In other words, when the ink has a pH of 10 and above, the ink dries more rapidly as the ink solution becomes more alkaline.

It is believed that under the alkaline conditions in accordance with the invention, the sizing material and the surface treatment material present in the recording paper are dissolved. This exposes the pulp fibers so that the ink penetrates rapidly. Accordingly, the ink prepared in accordance with the invention not only has a pH adjusted to between about 10 and 14, but the ink composition should include a material capable of dissolving a sizing material, a surface material and a fibrous material present in the print paper. The preferred component is a strong basic component. However, ink may also include sulfuric acid, maleic anhydride, and the like.

In accordance with the preferred embodiment of the invention, the liquid ink includes a basic component for adjusting the pH of the ink solution to about 10 to 14, a dye, a wetting agent and water. The preferred basic component is a strong basic substance, such as an alkali metal hydroxide. Examples of alkali substance, such as are sodium hydroxide, and potassium hydroxide and lithium hydroxide. These hydroxides readily dissolve in water containing the wetting agent, and are highly stable.

In addition to the alkali metal hydroxide, alkaline metal carbonates, ammonia and amines may also be used. When sodium hydroxide or potassium hydroxide is used as the strong basic component, the addition from about 0.001 to 15 weight percent, based on the total weight of the ink composition, is sufficient to adjust the pH of the ink solution to be between about 10 and 14 at a temperature of 20° C. The alkaline hydroxide may easily be added in the form of an aqueous solution. In this case, between about 0.05 and 10 weight percent of a 10 normal solution of a strong basic substance sufficiently raises the pH to the desired range. Preferably, between about 0.05 and 3.5 parts by weight of a 10 normal solution per 100 parts of ink solution in sufficient.

The strong alkali, such as sodium hydroxide and potassium hydroxide tend to react with a wetting agent such as glycerine and the like, forming an alkoxide. To demonstrate this, three weight percent of a ten normal solution of sodium hydroxide and potassium hydroxide were respectively added to a 15% glycerine in water solution. The solutions were placed in vinylchloride tubes having an internal diameter of 1 mm and after three days, the sodium alkoxide and potassium alkoxide products were obtained. The sodium alkoxide of the glycerine formed a gel clogging the tube. In contrast, the potassium alkoxide remained a liquid, which is preferable for adjusting the pH of the solution when maintained at a higher temperature. Fortunately, both the sodium hydroxide and potassium hydroxide tend not to produce the alkoxide at room temperature. Therefore, when stability of the ink as higher temperatures is not of concern, corrosiveness of potassium hydroxide is greater than that of sodium hydroxide.

The dyes utilized in the ink compositions prepared in accordance with the invention are soluble in water or dispersable dyes for upgrading the waterfastness and lightfastness of the printer characters. Additionally, the dyes utilized in compositions in accordance with the invention should have increased solubility and increased degree of dispersion in water including a wetting agent. Such dyes are more resistant to separating out and causing clogging in the nozzle orifices. The preferred dyes, include for example Kayaku Direct Deep Black xA, Kayaku Direct Special Black AxN, Kayaset Black 009A, Kayaset 010, Kayaset Black 021, Kayaset Violet 001, Kayaset Blue 005, Kayarus Turquoise Blue GL. (Each of these trademarks identifies dyes made by Nippon Kayaku, a Japanese company.).

The dye is included in the aqueous compositions prepared in accordance with the invention below 10 weight percent, based on the total weight of the ink composition. When more than about 10 weight percent of the dye is added the nozzle orifice tends to clog easily. Therefore, below and 10 weight percent, and preferably between about 0.5 and 2.5 weight percent dye should be included.

The wetting agent is added to the ink compositions prepared in accordance with the invention in order to reduce the vapor pressure of the ink composition. This reduction in vapor pressure reduces the rate of evaporation of water from the composition. Additionally, it tends to increase the solubility of the dye and the basic material to some extent. This prevents clogging at the nozzle orifice. The wetting agents preferably added to ink compositions prepared in accordance with the invention are readily soluble in the water, completely mixable therewith and aid in dissolving the dyes and basic materials. The preferred wetting agents include compounds including an alaphatic polyhydric alcohol group, alkylether derivative groups of the aliphatic polyhydric alcohol group or acetate derivative group of the aliphatic polyhydric alcohol group. Specifically, the compounds including the polyhydric alcohol group include, ethylene glycol, diethylene glycol, triethylene glycol, propylene glycol, polyethylene glycol and glycerine. The alkylether derivatives include, ethylene glycol monomethyl ether, ethylene glycol monoethyl ether, diethylene glycol monomethyl ether, diethylene glycol monobutyl ether, diethylene glycol dimethyl ethyl ether, diethylene glycol methyl ethyl ether and triethylene glycol monomethyl ether, and the like. The acetate derivatives include, ethylene glycol monomethyl ether acetate, diethylene glycol monoethyl ether acetate, glycerol monoacetate and glycerol diacetate, and the like. In addition, mixtures of the compounds including the polyhydric alcohol group, and alkyl ether derivative and the acetate derivative thereof can also be used.

The amount of wetting agent included in the ink compositions prepared in accordance with the invention in an important factor in determining the viscosity of the ink composition. When too much wetting agent is added, the viscosity of the ink composition is high, which is undesirable. When the viscosity of the ink is high, the response frequency of the recording head deteriorates thereby increasing the required driving voltage. Accordingly, between about 5 and 45 weight percent of wetting agent, and preferably between about 10 and 25 weight percent is added. The viscosity of the ink composition is preferrably adjusted to between about 1.5 to 19 centipose.

An additional nitrogen containing wetting agent for improving prevention of clogging at the nozzle orifice can also be added to the ink compositions prepared in accordance with this embodiment of the invention. At least one such additional wetting agent is a hydroxy alkyl-2-pyrrolidone having the general formula:

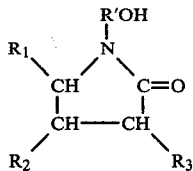

an N-alkyl-2 pyrrolidone shown by the general formula

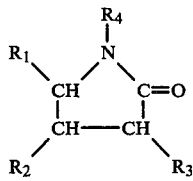

or mixtures thereof, wherein R' represents an alkylene group and $R_1$, $R_2$, $R_3$ and $R_4$ represent alkyl groups may be included in an ink composition. Generally between about one and 16, and preferably between about 3 and 8, weight percent of the additional nitrogen containing wetting agent may be substituted for the glycol containing wetting agent for preventing clogging at the nozzle orifice.

In order to insure that the ink compositions prepared in accordance with the invention will not become moldy or support the growth of micro organisms over extended storage periods, conventional anti-mold and water-soluble preservatives may be used. Such preservations, including such as dioxins sodium dehydroacetic. As acid the pH of the ink composition in accordance with the invention is high, the likelihood of micro organism growth is not likely.

The liquid ink compositions prepared in accordance with the invention rapidly dissolves the sizing material coating the pulp of the print paper when an ink drop impacts the paper. Thus, the ink dot rapidly penetrates through the fiberous pulp of the paper. The speed of penetration can be increased by addition of a surface active agent to the ink composition. A suitable surface active agent is a fluorocarbon surfactant having high resistance to alkalis. Additionally, conventionally nonionic surface active agents or anionic surface active agents can also be used.

The surface tension of the ink compositions prepared in accordance with the invention are adjusted to arrange from about 21 to 48 dyne/cm upon addition of the surface active agent so that the paper dries more rapidly. Surface active agents having a small contact angle with the paper, such as sodium oleate and dioctyl sulfosuccinate sodium salt thoroughly penetrates the paper. This causes blotting between the pulp fibers and, accordingly are not appropriate for use in compositions in acordance with the invention. When a fluorocarbon surfactant used, these problems are not encountered. For example, between about 0.001 to 0.1 weight percent of FC-128 (a trademark for a surface active agent produced by MMM Company in Sumitomo, Japan) is added to an ink composition in accordance with the invention, the paper dries more rapidly.

The liquid ink compositions prepared in accordance with the invention are particularly well suited for jet-type printers. Additionally, the ink compositions are suitable for use in all printers which use a liquid ink. As noted above, the liquid ink compositions prepared in accordance with the invention when used in an ink jet-type printer resist clogging the nozzle orifices and dry rapidly upon impacting the recording paper. As these ink compositions do not include any component which generates gas, air bubbles are not generated upon solidification of the ink. Thus, addition of the strong basic substance causes the ink to dry rapidly before any gas is produced. As the ink compositions are composed of stable components, the ink may be stored for long periods of time. Additionally, as the ink is alkaline, it tends not to corrode the material used in the print nozzle in contact therewith. The print density and the roundness of the dot are effectively obtained upon drying of the printed character. Therefore, all of the desired conditions set forth in paragraphs (a) to (f) called for are suitably met by the ink compositions prepared in accordance with the invention.

The ink compositions prepared in accordance with the invention will now be described in the following examples. These examples are intended to be illustrative and are not presented in a limiting sense. In each example, the percentages set forth are weight percents, based on the total weight of the ink composition, unless otherwise noted.

EXAMPLE 1

Into a two liter beaker equipped with a stirrer, 809 g of distilled water and 150 g of glycerine were added and stirred. As the stirring continued, 1 g of sodium dehydroacetic acid was added slowly. In separate vessel, 40 g of sodium hydroxide was added slowly to 100 cc of cooled distilled water to provide a solution of 10 normality of sodium hydroxide. 20 g of this 10 N solution of sodium hydroxide was added to the 2 liter beaker. Following stirring, 20 g of Kayaku Direct Deep Black xA was slowly added and stirring continued for six hours while maintaining the beaker at 60° C. The beaker and its contents was then cooled to room temperature and filtered through a milipore membrane filter (a product of the Milipore Corp.) having a pore size between 1 μm to 10 μm in diameter. The resulting ink composition included the following:

| COMPONENT | AMOUNT - WEIGHT % |
|---|---|
| Kayaku Direct Deep Black xA | 2 |
| Glycerine | 15 |
| 10N Solution of NaOH | 2 |
| Sodium Dehydroacetic Acid | 0.1 |
| Distilled Water | 80.9 |

The viscosity of the ink composition was 1.8 cp at 20° C., the surface tension was 54 dyne/cm at 20° C. and the pH was 12.4 at 20° C.

A portion of this ink composition was placed in a multi-head nozzle in an ink jet-type printer. The diameter of a nozzle orifice was 40 μm. A clear high quality printer record of black characters was obtained. The time required for the ink to dry on the recording paper was about five seconds. This time sufficiently short so that the ink composition is suitable for practical use.

EXAMPLE 2

An additional ink composition was prepared following the process described in Example 1. The ink composition prepared had the following composition:

| COMPONENT | AMOUNT - WEIGHT % |
|---|---|
| Kayaku Direct Special Black AxN | 2 |
| Glycerine | 5 |
| Triethylene Glycol | 10 |
| 10N Solution of KOH | 2 |
| Sodium Dehydroacetic Acid | 0.1 |
| Distilled Water | 80.9 |

The viscosity of this ink was 1.9 cp at 20° C., the surface tension was 52 dyne/cm at 20° C. and the pH was 12.3 at 20° C.

EXAMPLE 3

An additional ink composition was prepared following the process described in Example 1. The ink composition prepared had the following composition:

| COMPONENT | AMOUNT - WEIGHT % |
|---|---|
| Kayaset Black 021 | 1 |
| Glycerine | 6 |
| Glyceryl Monoacetate | 10 |
| 10N Solution of KOH | 3 |
| Sodium Dehydroacetic Acid | 0.1 |
| Distilled Water | 79.9 |

The viscosity of this ink was 1.8 cp at 20° C., the surface tension was 46 dyne/cm at 20° C. and the pH was 12.5 at 20° C.

EXAMPLE 4

An additional ink composition was prepared following the process described in Example 1. The ink composition prepared had the following composition:

| COMPONENT | AMOUNT - WEIGHT % |
|---|---|
| Kayaku Direct Special Black AxN | 2 |
| Glycerine | 4 |
| Triethylene Glycol | 12 |
| N—Methyl-2-Pyrrolidone | 5 |
| 10N Solution of NaOH | 2 |
| Sodium Dehydroacetic Acid | 0.1 |
| Distilled Water | 74.9 |

The viscosity of this ink was 2.0 cp at 20° C., the surface tension was 51 dyne/cm at 20° C. and the pH was 12.4 at 20° C.

EXAMPLE 5

An additional ink composition was prepared following the process described in Example 1. The ink composition prepared had the following composition:

| COMPONENT | AMOUNT - WEIGHT % |
|---|---|
| Kayaset Violet 001 | 2 |
| Glycerine | 4 |
| Triethylene Glycol | 20 |
| 10N Solution of NaOH | 3 |
| FC-128 (fluorocarbon surfactant 3M Co.) | 0.01 |
| Distilled Water | 70.99 |

The viscosity of this ink was 22 cp at 20° C., the surface tension was 28 dyne/cm at 20° C. and the pH was 12.5 at 20° C.

EXAMPLE 6

An additional ink composition was prepared following the process described in Example 1. The ink composition prepared had the following composition:

| COMPONENT | AMOUNT - WEIGHT % |
|---|---|
| Kayaku Direct Deep Black xA | 2 |
| Glycerine | 5 |
| Triethylene Glycol | 10 |
| 10N Solution of NaOH | 2 |
| Sodium Dehydroacetic Acid | 0.1 |
| Distilled Water | 80.9 |

The viscosity of this ink was 1.9 cp at 20° C., the surface tension was 52 dyne/cm at 20° C. and the pH was 12.4 at 20° C.

EXAMPLE 7

An additional ink composition was prepared following the process described in Example 1. The ink composition prepared had the following composition:

| COMPONENT | AMOUNT WEIGHT % |
|---|---|
| Kayaku Direct Deep Black xA | 2 |
| Glycerine | 15 |
| 10N Solution of KOH | 2 |
| Sodium Dehydroacetic Acid | 0.1 |
| Distilled Water | 80.9 |

The viscosity of this ink was 1.9 cp at 20° C., the surface tension was 54 dyne/cm at 20° C. and the pH was 12.4 at 20° C.

EXAMPLE 8

An additional ink composition was prepared following the process described in Example 1. The ink composition prepared had the following composition:

| COMPONENT | AMOUNT WEIGHT % |
|---|---|
| Kayaset Black 014 | 1 |
| Glycerine | 6 |
| Glyceryl Monoacetate | 10 |
| 10N Solution of KOH | 3 |
| Sodium Dehydroacetic Acid | 0.1 |
| Distilled Water | 79.9 |

The viscosity of this ink was 1.8 cp at 20° C., the surface tension was 46 dyne/cm at 20° C. and the pH was 12.5 at 20° C.

The ink compositions prepared in accordance with Examples 2–8 were placed in the multi-head print nozzle utilized in Example 1. The printing density and the printing quality remained high. The ink generally dried within five seconds from the time the ink dot impacted the print paper. Clogging of ink at the nozzle orifice did not occur. After the ink printing continued for about one hour, the nozzle orifice was exposed to the air for about 72 hours. This verified that each of the ink compositions prepared in accordance with the invention did not clog the nozzle when the ink was ejected again. The same favorable result was obtained with the ink compositions of Examples 1–8 when the ink was again ejected after exposure of the nozzle orifice for 144 hours.

EXAMPLE 9

Several ink compositions were prepared following the procedure described in Example 1 for testing on various types of print papers, the results of which are recorded in FIG. 1. The ink composition had the following composition:

| COMPONENT | AMOUNT - WEIGHT % |
| --- | --- |
| Kayaset Black 021 | 0.8 |
| Glycerine | 15 |
| Sodium Dehydroacetic Acid | 0.1 |
| XN Solution of KOH | 84.1 |

X was changed in order to vary the pH of the ink composition as shown by the Y-axis of the graph of FIG. 1.

In FIG. 1 the five curves represent the drying times of the inks printed on five different types of print papers. In this example, a print head having a nozzle orifice of 40 $\mu$m diameter is disposed at a position creating a gap of about 1 mm from the print paper to the edge of the nozzle. An electrical signal is applied to the electromechanical converter of the print head and drops of ink are ejected from the nozzle towards the print paper. The approximate weight of a ink drop is $3.35 \times 10^{-7}$ cc. The time within which the ink is considered to have dried is the same as described with respect to Examples 2–8.

The five types of paper utilized in this Example are as follows:

| PAPER | | PAPER DESCRIPTION |
| --- | --- | --- |
| A | Wood Free Paper* | Ream Weight 17 pounds; Manufactured by Daishowa Seishi K.K., Japan |
| B | Wood Free Paper | Ream Weight 17 pounds; Manufactured by Hokuetsu Pulp K.K. |
| C | Wood Free Paper | Ream Weight 17 pounds; Manufactured by Toyo Pulp K.K. |
| D | Wood Free Paper | Ream Weight 17 pounds; Manufactured by Tomoegawa Seishi K.K. |
| E | Paper of Middle Quality Between Wood Free Paper and Groundwood Paper* | Ream Weight 17 pounds; Manufactured by Kobayashi Kirokushi K.K. |

*Wood Free Paper consists of 100% chemical pulp and Groundwood Paper consists of 40% chemical pulp and 60% ground pulp.

The time required for the ink to dry at varying pH for each of the print papers is shown in the graph in FIG. 1. As pointed out above, when the pH of the ink composition is about 10 and above, the drying time decreases. Specifically, the drying time for each of the papers A, B, C and D utilized in this Example decreases significantly when the pH of the ink composition is in the range between about 12 and 13.5.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A liquid ink composition including an effective amount of a component capable of dissolving at least one of a fibrous material, sizing material and a surface treatment material present in a recording medium to permit the ink to penetrate the recording medium, comprising:
   a water-soluble dye;
   a wetting agent selected from the group consisting of aliphatic polyhydric alcohols, alkylether derivatives of aliphatic polyhydric alcohols, acetate derivatives of aliphatic polyhydric alcohols and mixtures thereof;
   at least one strong basic alkali metal hydroxide; and
   water; the composition having a pH between about 12 and 14 at 20° C.

2. The ink composition of claim 1, wherein said strong basic material is present between about 0.001 to 15 weight percent of the ink composition.

3. The ink composition of claim 2, wherein the ink composition has a surface tension of between about 21 to 48 dyne/cm at 20° C.

4. The ink composition of claim 2, further including from about 0.001 to 0.1 weight percent of a fluorocarbon surface active agent.

5. The ink composition of claim 1 comprising:
   at least a minimum effective amount to about 10 weight percent water-soluble dye;
   from about 0.001 to 15 weight percent strong basic material;
   from about 5 to 45 weight percent of at least one wetting agent; and
   the remainder water, all weight percentage based on the total weight of the composition.

6. A liquid ink composition, comprising:
   between about 0.5 to 2.5 weight percent of a water-soluble dye;
   about 0.005 to 5 weight percent of a strong basic material capable of dissolving at least one of a fibrous material, sizing material and a surface treatment material present in a recording medium and to adjust the pH of the composition to between about 12 and 13.5;
   about 10 to 25 weight percent of at least one wetting agent; and
   the remainder water, all weight percentages based on the total weight of the composition and the composition having a pH between about 12 and 14 at 20° C.

7. The ink composition of claim 6 wherein said wetting agent is selected from the group consisting of aliphatic polyhydric alcohols, alkylether derivatives of aliphatic polyhydric alcohols, acetate derivatives of aliphatic polyhydric alcohols and mixtures thereof.

8. The ink composition of claims 5 or 6, wherein from about 1 to 16 weight percent of said wetting agent is replaced by a nitrogen-containing wetting agent.

9. The ink composition of claim 8, wherein said nitrogen-containing wetting agent is a compound selected from the group consisting of
   (a) hydroxy alkyl-2-pyrrolidone represented by the general formula

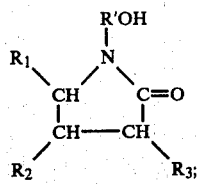

(b) N-alkyl-2-pyrrolidone represented by the general formula

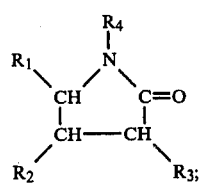

and mixtures thereof and wherein R' represents an alkylene group and $R_1$, $R_2$, $R_3$ and $R_4$ represent alkyl groups.

10. The ink composition of claim 2, wherein said strong basic material is a 10 normal aqueous solution present between about 0.3 to 2 weight percent of the ink composition.

11. The ink composition of claim 1, wherein said strong basic material is selected from the group consisting of sodium hydroxide and potassium hydroxide.

* * * * *